United States Patent Office 2,882,186
Patented Apr. 14, 1959

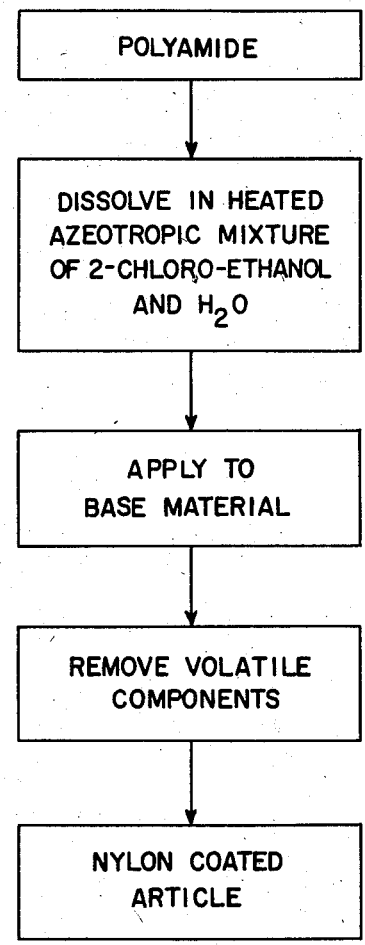

2,882,186

POLYAMIDE COATING COMPOSITION DISSOLVED IN HEATED AZEOTROPIC MIXTURE OF 2 - CHLORO - ETHANOL AND WATER AND METHOD OF APPLICATION

Endre Schönberg, Velp, and Karel Wilbrink, Arnhem, Netherlands, assignors to American Enka Corporation, Enka, N.C., a corporation of Delaware Application November 15, 1956, Serial No. 622,257

Claims priority, application Netherlands November 26, 1955

9 Claims. (Cl. 117—161)

This invention relates to synthetic linear polyamides and more particularly to new and useful compositions containing polyamides and methods of preparing and applying same.

The synthetic linear polyamides with which this invention is concerned are polymers referred to by the generic term nylon. In commercial production today there are two principal types of nylon known as 6-nylon and 6,6-nylon. Nylons of the 6-nylon general class may be made from the polycondensation of omega-amino carboxylic acid having a straight chain of five or more carbon atoms between the amino group and the carboxylic group. Commercially, 6-nylon is prepared from the polycondensation of E-caprolactam. Nylons of the 6,6-nylon general class may be made from the polycondensation of dicarboxylic acids having a straight chain of at least three carbon atoms between the carboxyl groups with diamines having a straight chain of at least four carbon atoms between the amine groups. Commercially, 6,6-nylon is manufactured from the polycondensation of adipic acid and hexamethylenediamine.

It is well known that the nylons have remarkable properties for use in textile fibers, bristles, sheets, and coatings. The present invention is directed to a new composition and method for using nylon to coat base materials such as metal, paper, fabric, regenerated cellulose and the like.

It is known in the art that the nylon may be used as a coating by first dissolving nylon in a suitable solvent and later evaporating the solvent. Solvents for synthetic linear polyamides are known. Ordinarily nylons are soluble only in very strong solvents such as formic acid, phenols and phosphoric acid. However, phenols and strong mineral acids are of no value in the present process since they degrade nylon by hydrolysis and alter the chemical composition of it.

It is known that 2-chloro-ethanol may be suitable as a solvent for nylon. When this solvent is used, the nylon may later be removed without any noticeable degradation of the nylon. In fact a method is known for preparing finely divided nylon powder by dissolving nylon, the 6 type and the 6,6 type, and then precipitating it out of solution in particles of the desired size by addition of a non-solvent, for example, water. Ordinarily when 2-chloro-ethanol is the solvent, a mixture of 6-nylon and 6,6-nylon is used because the mixture of polyamide is more soluble in this solvent than when each type is used individually.

An object of the present invention is to provide a fluid composition of polyamide useful for coating materials.

Another object of the present invention is to provide a method for the preparation of a coating material containing a polyamide.

Still another object of the present invention is to provide a method for coating metals, fabrics, paper, and the like with a polyamide.

According to the present invention these objects are accomplished by dissolving a synthetic linear polyamide in the azeotropic mixture of 2-chloro-ethanol and water, the mixture being heated to a temperature of at least 80° C., applying the solution thus obtained directly to metals, paper, fabrics, ceramics and the like, and thereafter drying the coated material to develop a tough, continuous, resilient, smooth surface.

The attached drawing is a flow diagram illustrating the present invention.

The solubility of 6-nylon or 6,6-nylon in the azeotropic mixture of 2-chloro-ethanol and water is indeed surprising and unexpected. The azeotropic mixture consists of 57.5% by weight of 2-chloro-ethanol and 42.5% by weight of water. Even at the temperature of 80° C. or above, it is possible to dissolve either type of nylon in amounts of up to 20% by weight.

It is possible to dissolve a sufficient amount of nylon in 2-chloro-ethanol in a relatively large amount of water for direct application as a coating material without the need of evaporating the solvent before application. It is possible according to the present invention to dissolve sufficient amount of either type of nylon in 2-chloro-ethanol and water for coating purposes without the need of using a mixture of the two types of nylon.

Another very important advantage of employing the above mentioned azeotropic mixture is that after coating the solvent mixture may easily be evaporated. The boiling point of the said mixture is only 98° C. as against 128° C. for the unmixed 2-chloro-ethanol.

Not only is it more economical to dry the coated material but if heat is used in the drying, nylon is subject to a lesser degree to degradation by the heat at the lower temperature.

When nylon is dissolved in 2-chloro-ethanol, there is a tendency for hydrochloric acid to be formed which of course is deleterious to the nylon and may be detrimental to the apparatus in which the products are treated and to some products to be treated, such as fabrics and paper. There is a greater tendency for the undesirable hydrochloric acid to form when the evaporating of the solvent is required to be carried out at a more elevated temperature. By the present invention, the evaporating step may proceed rapidly at a lower temperature than is required for pure 2-chloro-ethanol with a correspondingly suppression of the tendency for hydrochloric acid to form.

An important feature of the present invention is that the disadvantage of the formation of hydrochloric acid may be completely overcome by adding a salt to buffer the pH of the solvent mixture to between 6.8 and 9.2. Above a pH of 6.8 hydrochloric acid will not noticeably form. For example, borax may be used as a buffering agent. However, other salts exerting a buffering influence comparable to borax may of course be selected.

Another important embodiment of the present invention is that it is possible to form a coating exhibiting an unusually high degree of gloss and having unusual strength by adding up to 3.5% trichloro-ethanol to the azeotropic mixture in which the polyamide is dissolved.

A very important aspect of the present invention is the coating material may be applied in a relatively cold condition. By experimentation it was unexpectedly found that polyamide in an azeotropic mixture of water and 2-chloro-ethanol in a cool condition exhibited a thixotropic phenomenon. For example, when a warm solution containing 5% to 20% of either 6-nylon or 6,6-nylon is cooled, a wax-like gel is formed which the usual lacquering machine could not use as a coating material. However, this anomalously high viscosity disappears and a thixotropic semi-liquid paste results when the gel is mechanically agitated. The resulting thixotropic semi-liquid paste may easily be applied on fabrics, paper, films, wood, etc., by a conventional coating or lacquering machine. After the paste is applied on the material, the solvent should be substantially evaporated to dryness, as for example by heating the coated material to about 80° C. or above whereby the paste becomes a liquid and thereafter dries to a clear continuous coating layer. It is preferred that the evaporation be done at a temperature which does not cause deterioration of the material being coated or the coating material. Vacuum drying may be preferred under certain conditions.

For commercial utilization of the present invention it may be preferred to incorporate into the solution or thixotropic paste of the polyamide dyes or pigments in order to form a colored coating material of unusual fastness. The coloring material may be added at any stage before the solvents are removed by evaporation.

Furthermore, a plasticizer may be incorporated into the coating material. Any suitable plasticizer for nylon may be used, the selection of the particular plasticizer is dependent, of course, on the ultimate purpose served by the coating composition. As for example, the plasticizing material selected for use in coating a pair of gloves where a soft, pliable and tenacious coat is desired would be different from the plasticizing material selected for use in coating a board where a hard, tough, strong surface may be preferred.

Other known nylon modifying agents may conveniently be incorporated into the solution of polyamide coating to increase the chemical resistance, water and oil impermeability, resistance to light and heat deterioration, resistance to peeling off and to retard cracking of the coat. For example, when resistance to fat penetration is of importance, carboxy methyl cellulose or its ethyl cellulose derivative may be satisfactorily incorporated into the coating composition.

While virgin nylon may be used in the present invention, waste nylon may provide an inexpensive source of material. Scrap and waste nylon obtained in its production, if absolutely clean, can be remelted and used again, but often such material is contaminated by oil, dust, etc. This waste which cannot be conveniently reprocessed provides a most cheap and satisfactory source of polyamide for most coating purposes.

The practice of the invention may be illustrated by the following specific examples.

Example I

Waste, obtained on manufacturing artificial threads from E-caprolactam, is cut into pieces with a length of about 5–10 mm. The finely cut nylon in the amount to give a resulting solution of 7.5% polyamide by weight is added to an azeotropic mixture of 2-chloro-ethanol and water having a temperature at or near 98° C. (the boiling temperature of the mixture). The dissolving is more readily accomplished by making the addition while stirring the solvent.

The warm clear solution is next applied to the base material to be coated, for example, paper, with the aid of a coating machine of conventional construction. This coated paper is next heated at a temperature of 100° C. to effectively evaporate the solvent mixture.

The coated layer thus formed has a uniform thickness, is clear, transparent and free of pores. The layer is a physically and chemically resistant composition in the same manner that is characteristic of nylon.

Example II

A composition according to this invention is prepared by dissolving 7.5% by weight of poly-E-caprolactam while stirring into a boiling solution of the azeotropic mixture of 2-chloro-ethanol and water containing 2% by weight of tri-chloro-ethanol and also 2% by weight of sodium tetraborate (borax) as a stabilizing agent.

The warm clear solution is applied to a paper base by a coating machine of usual construction. The coated material is heated to around 100° C. for a period of time to evaporate the coating composition to substantial dryness. The paper obtained is covered with a uniform, strong, clear and transparent film, being free of pores and having an unusually high gloss. The composition exhibits the same physical and chemical properties expected of 6-nylon.

Example III

A boiling azeotropic mixture of 2-chloro-ethanol and water having incorporated therein 7.5% poly-E-caprolactam is cooled until a wax-like gel forms. This gel is ground in a ball mill to a thixotropic semi-liquid paste, which immediately thereafter is applied on a continuously moving web of paper by using a coating machine of the usual construction.

The web of paper thus coated is then led over steam heated rollers. The coat first becomes fluid and then subsequently dries to a clear and transparent solidly adhering film.

Although in the examples the present invention has only been described in relation to poly-E-caprolactam, this does not mean that the invention is limited in this respect. Also, other polyamides, e.g. 6,6-nylon, may also be used as a starting material for the preparation of the coating composition according to the present invention.

The above specific examples are illustrative but not limitative of the practice of the invention.

What is claimed is:

1. A process of coating a base material with synthetic linear polyamide which comprises dissolving between about 5 and 20% of said polyamide into a heated azeotropic mixture of 2-chloro-ethanol and water, said mixture having a temperature of at least 80° C., applying a sufficient amount of the resulting warm solution of polyamide to a base material to form a surface film, and thereafter substantially removing the volatile components therefrom, thereby producing a smooth continuous film.

2. The process of claim 1 in which the polyamide is a polycondensation product of an omega-amino carboxylic acid having a straight chain of five or more carbon atoms between the amino group and the carboxylic group.

3. The process of claim 1 in which the polyamide is the polycondensation product of a dicarboxylic acid having a straight chain of at least three carbon atoms between the carboxyl groups and a diamine having a straight chain of at least four carbon atoms between the amino groups.

4. The process of claim 1 in which a sufficient amount of a buffering agent has been incorporated into the azeotropic mixture to maintain a solution having a pH from 6.8 to 9.2.

5. The process of claim 1 in which up to 3.5% trichloroethanol has also been incorporated into the azeotropic mixture.

6. A process of coating a base material with synthetic linear polyamide which comprises dissolving between about 5–20% of said polyamide into a heated azeotropic mixture of 2-chloro-ethanol and water, said mixture having a temperature of at least 80° C., allowing the solution thus obtained to form a wax-like gel, mechanically agitating said gel until a thixotropic semi-liquid paste results, applying said paste to a base material, heating the coated base material to a temperature sufficient for said paste to become fluid, maintaining the temperature thereof for a sufficient amount of time to evaporate the volatile components therefrom, thereby producing a smooth continuous film.

7. A composition for coating a base material comprising an azeotropic mixture of 2-chloro-ethanol and water in which 5–20% synthetic linear polyamide has been dissolved.

8. The composition of claim 7 in which a buffering agent has been incorporated in a sufficient amount to maintain the pH of the composition from 6.8 to 9.2.

9. The composition of claim 7 in which up to 3.5% tri-chloro-ethanol has also been incorporated.

References Cited in the file of this patent

UNITED STATES PATENTS

| | | |
|---|---|---|
| 2,293,760 | Peters | Aug. 25, 1942 |
| 2,714,097 | Watson et al. | July 26, 1955 |
| 2,742,440 | Stott et al. | Apr. 17, 1956 |